(12) United States Patent
Chawalitkiijmongkol et al.

(10) Patent No.: US 12,187,872 B2
(45) Date of Patent: Jan. 7, 2025

(54) HIGH EMISSIVITY COATING COMPOSITIONS, AND PROCESSES FOR PREPARING AND APPLYING THE SAME

(71) Applicants: THAI OIL PUBLIC COMPANY LIMITED, Bangkok (TH); CHULALONGKORN UNIVERSITY, Bangkok (TH)

(72) Inventors: Nikom Chawalitkiijmongkol, Bangkok (TH); Prapod Ruthaiputpong, Bangkok (TH); Boonrat Lohwongwatana, Bangkok (TH); Atchara Khamkongkaeo, Bangkok (TH)

(73) Assignees: THAI OIL PUBLIC COMPANY LIMITED, Bangkok (TH); CHULALONGKORN UNIVERSITY, Bangkok (TH)

( * ) Notice: Subject to any disclaimer, the term of this patent is extended or adjusted under 35 U.S.C. 154(b) by 643 days.

(21) Appl. No.: 17/595,963

(22) PCT Filed: Dec. 6, 2019

(86) PCT No.: PCT/TH2019/000064
§ 371 (c)(1),
(2) Date: Nov. 30, 2021

(87) PCT Pub. No.: WO2021/112774
PCT Pub. Date: Jun. 10, 2021

(65) Prior Publication Data
US 2022/0332919 A1    Oct. 20, 2022

(51) Int. Cl.
*C08K 3/22* (2006.01)
*B05D 1/02* (2006.01)
*C09D 7/61* (2018.01)
*C09D 183/06* (2006.01)

(52) U.S. Cl.
CPC ............ *C08K 3/22* (2013.01); *B05D 1/02* (2013.01); *C09D 7/61* (2018.01); *C09D 183/06* (2013.01); *B05D 2202/15* (2013.01); *B05D 2350/50* (2013.01); *B05D 2518/10* (2013.01); *C08K 2003/2251* (2013.01); *C08K 2003/2265* (2013.01); *C08K 2003/2289* (2013.01); *C08K 2003/2293* (2013.01)

(58) Field of Classification Search
None
See application file for complete search history.

(56) References Cited

U.S. PATENT DOCUMENTS

| | | | |
|---|---|---|---|
| 4,469,721 A | 9/1984 | Shioya | |
| 6,613,427 B1 | 9/2003 | Morrison et al. | |
| 6,921,431 B2 | 7/2005 | Evans et al. | |
| 7,105,047 B2 | 9/2006 | Simmons et al. | |
| 2005/0051057 A1 | 3/2005 | Evans et al. | |
| 2008/0156228 A1 | 7/2008 | Yadav | |

FOREIGN PATENT DOCUMENTS

| | | | |
|---|---|---|---|
| CN | 101245241 A | * | 8/2008 |
| EP | 1335004 A1 | | 8/2003 |
| KR | 2019-0015775 A | | 2/2019 |

OTHER PUBLICATIONS

Machine translation of Zhu et al., CN 101245241 A (Year: 2008).*
International Search Report and Written Opinion received for PCT Patent Application No. PCT/TH2019/000064, mailed on Apr. 27, 2020, 8 pages.

* cited by examiner

*Primary Examiner* — Coris Fung
*Assistant Examiner* — Keling Zhang
(74) *Attorney, Agent, or Firm* — WOMBLE BOND DICKINSON (US) LLP

(57) ABSTRACT

To provide a high emissivity coating composition capable of exhibiting a higher emissivity at a low elevated temperature and substantially reduced formation micro craze when coated upon a substrate, and enabling a simplified application process, a high emissivity coating composition, comprising a powder mixture for providing emissivity; a binder for providing adhesion; and a co-binder for promoting adhesion and film-forming, characterized in that the powder mixture comprises at least three metal compounds of formula $A_{(y-3)}B_{y/2}O_y$, wherein y is 4; A is selectable from a group of Ni and Co; B is selectable from a group of Fe and Cr; and O is oxygen; and the co-binder is an aqueous solution comprising silica in a compound of Formula (1), wherein $R_1$ is $H-Si-(CH_3)_2$; and a compound of Formula (2), wherein $R_2$ is $CH_3$, is disclosed herein.

19 Claims, No Drawings

HIGH EMISSIVITY COATING COMPOSITIONS, AND PROCESSES FOR PREPARING AND APPLYING THE SAME

FIELD OF INVENTION

The present disclosure relates to coating compositions, and processes for preparing and applying coating compositions. In particular, such compositions and processes are used for increasing emissivity of metal substrates. More particularly, such metal substrates are featured in elevated-temperature equipment or heating equipment or tube, such as furnaces, ovens, or kilns.

BACKGROUND OF THE INVENTION

Emissivity ($\varepsilon$) is the ability of material surface to transfer or receive heat via thermal radiation. Theoretically, the maximum value of $\varepsilon$ is one, which is that of a black body. Only a small change (say, a hundredth) in emissivity value would in fact substantially affect the heat flux of thermal radiation, expressed by the commonly known $Q=\varepsilon\sigma T^4$. For a firing process designed for industrial use which handles a great amount of heat, this emissivity is key to enhancing the heat transfer efficiency.

A common method for increasing emissivity is surface coating, also known as high emissivity coating, whereby a high-emissivity coating is applied on the surface of a substrate featured in the heating equipment or firing process. Such substrates are normally part of the component(s) from which heat radiates to the target of heating. Examples of such component include a fired metal tube in a furnace. When the high emissivity coating is applied, the component is capable of absorbing heat at a higher heat flux, providing a bigger heating flux, and thus resulting in less energy consumption.

In general, composition of a high emissivity coating includes at least an emissivity agent, fillers, and a binder. The emissivity agent affects the substrate's emissivity; the binder provides the adhesion between the emissivity agent, fillers, and the substrate. A co-binder may as well be added to promote the adhesion (i.e. adhesion between coating film and substrate) and cohesion, (i.e. adhesion of the coating film). The particulars of a composition depend much on the substrate and working conditions. In many cases the composition is prepared and applied in the form of paint.

There are a few technical issues arising from the existing practices. For example, while some coating compositions give a high emissivity at a higher elevated temperature (about 900° C. or higher), some metal coating applications needs high emissivity at a lower elevated temperature (about 650° C. or lower). Lack of durability, craze of the coating itself, complicated application processes, and the need to treat the coating composition at a high temperature, are further examples.

Here, the question of emissivity is directed to metallic substrates, as opposed to non-metallic substrates like refractories. An example of emissivity imparted by the existing arts is found in the U.S. Pat. No. 6,613,427 B1 which discloses $\varepsilon$ of larger than 0.9 at an elevated temperature as high as 1000° C.

As for the durability issue, a coating is prone to physical and/or chemical disintegration resulted from the constant exposure to a high operating temperature. Such disintegration may be accelerated by structural weaknesses such as micro crazes formed during the application of coating. Many attempts have been made to reduce the formation of micro crazes, at the expenses of complicating or prolonging the coating process. The methods per the U.S. Pat. No. 5,164,003 is an example of such attempts.

Performance in other aspects of high-emissivity coating may be optimized by other existing treatments, which involve performing extra working steps to the composition or substrate. For instance, *Int. J, Min. Met. Mater. Vol.* 19, No. 2. 2012 suggests a heat treatment for coating a high emissivity composition comprising a single nickel chromite upon a substrate, which can increase the emissivity value from 0.875-0.896 up to 0.91 at 600° C. Single $Co_{0.3}Cr_{0.7}O_{x(x=2-3)}$ has been reported of its emissivity of 0.92 at a temperature as high as 800° C., *Rare Mat. Eng., Vol* 41, *No. S1*, 2012. Single nickel ferrite, $NiFe_2O_4$, has been disclosed regarding its maximum emissivity of 0.9 following a treatment at a temperature of 1200° C., *Sil. J., Vol.* 42, *No.* 6, 2014. The particulars of a treatment depend much on the composition and treatment objective, but any treatment would encumber the coating process.

The following publications disclose high emissivity compositions or methods of coating application. However, the solution to the above technical issues are not taught therein.

The U.S. Pat. No. 4,469,721 teaches a high emissivity refractory coating composition, comprising a powder mixture having silicon carbide, graphite, aluminum oxide, silicon nitride, tricobalt tetroxide, cobalt aluminum oxide, and ferrosilicon; and an aqueous solution of potassium silicate. The relevant substrate is the furnace refractories or ceramic fibers.

The European Patent No. 1,335,004 B1 suggests a black high temperature emissivity paint comprising a black pigment, acrylic resin, silicone resin, and a solvent. The black pigment comprises (i) a single metal $(Co,Fe)(Fe,Cr)_2 O_4$ spinel; and (ii) metallic element nickel. Such paint is applied to components of a gas turbine engine, which is run at its normal operating conditions at a high elevated temperature, 900° C.

The U.S. Pat. No. 6,921,431 B2 provides a technical disclosure relating to a thermal protective coating for ceramic surfaces. Such coating contains colloidal silica, colloidal alumina, or combinations thereof; a filler such as silicon dioxide, aluminum oxide, titanium dioxide, magnesium oxide, calcium oxide and boron oxide; and one or more emissivity agents such as silicon hexaboride, carbon tetraboride, silicon tetraboride, silicon carbide, molybdenum disilicide, tungsten disilicide, zirconium diboride, cupric chromite, or metallic oxides such as iron oxides, magnesium oxides, manganese oxides, chromium oxides, copper chromium oxides, cerium oxides, terbium oxides, and derivatives thereof. In a coating solution, an admixture of the coating contains water. A stabilizer such as bentonite, kaolin, magnesium alumina silicon clay, tabular alumina and stabilized zirconium oxide is also added.

Furthermore, the U.S. Pat. No. 7,105,047 B2 teaches a thermal protective coating for metallic substrates. Such coating contains an inorganic adhesive such as an alkali/alkaline earth metal silicate such as sodium silicate, potassium silicate, calcium silicate, and magnesium silicate; a filler such as a metal oxide for example silicon dioxide, aluminum oxide, titanium dioxide, magnesium oxide, calcium oxide and boron oxide; and one or more emissivity agents such as silicon hexaboride, carbon tetraboride, silicon tetraboride, silicon carbide, molybdenum disilicide, tungsten disilicide, zirconium diboride, cupric chromite, or metallic oxides such as iron oxides, magnesium oxides, manganese oxides, chromium oxides and copper chromium oxides, and derivatives thereof. In a coating solution, an admixture of the coating contains water. A stabilizer such as bentonite, kaolin, magnesium alumina silicon clay, tabular alumina and stabilized zirconium oxide may be added.

Accordingly, high emissivity coating compositions and the process for preparation and application of such composition that are capable of addressing the abovementioned technical issues are not found.

SUMMARY OF THE INVENTION

An object of the present invention is to provide a high emissivity coating composition for use with metal substrates that is capable of exhibiting a high emissivity at lower elevated temperature, substantially reducing the formation of micro crazes upon coating, and is easy to prepare and apply.

A further object of the present invention is to provide a process for preparing a high emissivity coating composition for metal substrates application that is capable of exhibiting a high emissivity at lower elevated temperature, substantially reducing the formation of micro crazes upon coating, and is convenient to apply.

A yet further object of the present invention is to provide a process for applying a high emissivity coating composition for metal substrates application that is capable of exhibiting a high emissivity at lower elevated temperature and substantially reducing the formation of micro crazes upon coating.

Embodiments in accordance with the present invention may be described in different aspects.

In one aspect, an embodiment is a high emissivity coating composition, comprising (I) a powder mixture for providing emissivity; (II) a binder for providing adhesion; and (III) a co-binder for promoting adhesion and film-forming. Embodiments in accordance with this aspect are characterized by the followings: the powder mixture comprises at least three metal compounds of formula $A_{(y-3)}B_{y/2}O_y$, wherein y is 4; A is selectable from a group of Ni and Co; B is selectable from a group of Fe and Cr; and O is oxygen; and the co-binder is an aqueous solution comprising silica in a compound of Formula (1); and a compound of Formula (2), below:

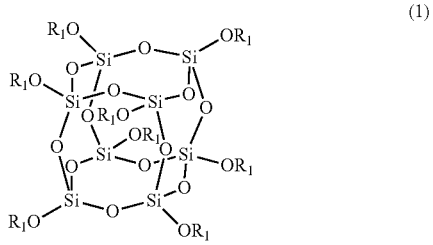
(1)

wherein $R_1$ may be selected from H—Si—$(CH_3)_2$, H—Si—$(C_2H5)_2$, H—Si—$(C_3H_7)_2$, H—Si—$(C_4H_7)_2$, and H—Si—$(C_5H_9)_2$. H—Si—$(CH_3)_2$ is preferable;

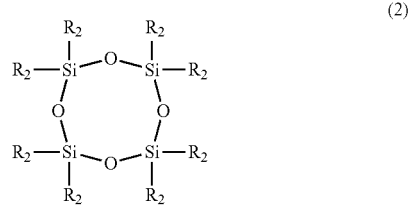
(2)

wherein $R_2$ may be selected from $CH_3$, $C_2H_5$, $C_3H_7$, $C_4H_7$, and $C_5H_9$. $CH_3$ is preferable.

Per the above structures, Formulas (1) and (2) may be called dimethyl siloxy silsesquioxane and octamethyl cyclotetrasiloxane, respectively.

Preferably, the three metal compounds of formula $A_{(y-3)}B_{y/2}O_y$ have spinel structures. More preferably, these three metal compounds are nickel ferrite ($NiFe_2O_4$), nickel chromite ($NiCr_2O_4$), and cochromite ($CoCr_2O_4$).

It is also preferable that, in addition to the abovementioned three metal compounds, the powder mixture further comprises "fillers". Such fillers are preferably a mixture of cobalt oxide (CoO), titanium diboride ($TiB_2$), chromium diboride ($CrB_2$), magnetite ($Fe_3O_4$), kaolin ($Al_4(OH)_8Si_4O_{10}$), and silica ($SiO_2$) in quartz form.

A preferable composition of the powder mixture is one comprising 20-50% by weight of a combination of $NiFe_2O_4$ and $NiCr_2O_4$; 5-20% by weight of $CoCr_2O_4$; 5-15% by weight of CoO; 5-10.6% by weight of $TiB_2$; 1-5% by weight of $CrB_2$; 1-15% by weight of $Fe_3O_4$; 5-15% by weight of $Al_4(OH)_8Si_4O_{10}$; and 8-30% by weight of $SiO_2$ (quartz form). More preferably, the powder mixture comprises 10-30% by weight of $NiFe_2O_4$, or comprising 10-20% by weight of $NiCr_2O_4$.

The binder is preferably an aqueous solution comprising potassium silicate, or more preferably, an aqueous solution comprising 20-40% by weight of potassium silicate. Even more preferably, the binder presents in 30% by weight of potassium silicate.

Preferably, the co-binder comprises 45-55% by weight in dry basis of a combination of silica, dimethyl siloxy silsesquioxane, and octamethyl cyclotetrasiloxane.

It is also preferable that the weight ratio of the powder mixture, the binder, and the co-binder is within a range of 1-5:0.5-4:1, more preferably within a range of 2.5-3.5:2.3-3.2:1.

In a further aspect, an embodiment is a process for preparing a high emissivity coating composition, comprising steps of (I) providing a powder mixture comprising at least three metal compounds of formula $A_{(y-3)}B_{y/2}O_y$, wherein y is 4; A is selectable from a group of Ni and Co; B is selectable from a group of Fe and Cr; and O is oxygen; (II) providing a first aqueous solution comprising potassium silicate; providing a second aqueous solution comprising silica in a compound of Formula (1) above, wherein $R_1$ is H—Si—$(CH_3)_2$; and a compound of Formula (2) above, wherein $R_2$ is $CH_3$; and (III) mixing the powder mixture with the first aqueous solution and the second aqueous solution.

Per the above structures, Formulas (1) and (2) may be called dimethyl siloxy silsesquioxane and octamethyl cyclotetrasiloxane, respectively.

Preferably, the mixing of the powder mixture with the first aqueous solution (binder) and the second aqueous solution (co-binder) is for forming a uniform suspension.

Preferably, the three metal compounds of formula $A_{(y-3)}B_{y/2}O_y$ have spinel structures. More preferably, these three metal compounds are nickel ferrite ($NiFe_2O_4$), nickel chromite ($NiCr_2O_4$), and cochromite ($CoCr_2O_4$).

It is also preferable that, in addition to the abovementioned three metal compounds, the powder mixture further comprises "fillers". Such fillers are preferably a mixture of cobalt oxide (CoO), titanium diboride ($TiB_2$), chromium diboride ($CrB_2$), magnetite ($Fe_3O_4$), kaolin ($Al_4(OH)_8Si_4O_{10}$), and silica ($SiO_2$) in quartz form.

A preferable composition of the powder mixture is one comprising 20-50% by weight of a combination of $NiFe_2O_4$ and $NiCr_2O_4$; 5-20% by weight of $CoCr_2O_4$; 5-15% by weight of CoO; 5-10.6% by weight of TiB$_2$; 1-5% by weight of CrB$_2$; 1-15% by weight of Fe$_3$O$_4$; 5-15% by weight of Al$_4$(OH)$_8$Si$_4$O$_{10}$; and 8-30% by weight of SiO$_2$ (quartz form). More preferably, the powder mixture comprises 10-30% by weight of NiFe$_2$O$_4$, or comprising 10-20% by weight of NiCr$_2$O$_4$.

Preferably, the first aqueous solution (binder) comprises 20-40% by weight of potassium silicate. More preferably, the binder presents in 30% by weight of potassium silicate.

Preferably, the second aqueous solution (co-binder) comprises 45-55% by weight in dry basis of a combination of silica, dimethyl siloxy silsesquioxane, and octamethyl cyclotetrasiloxane.

It is also preferable that the weight ratio of the powder mixture, the first aqueous solution, and the second aqueous solution is within a range of 1-5:0.5-4:1, more preferably within a range of 2.5-3.5:2.3-3.2:1.

In a yet further aspect, an embodiment is a process for applying a high emissivity coating composition to a substrate, comprising steps of (I) providing a high emissivity coating composition comprising a powder mixture and an aqueous solution; (II) spraying the high emissivity coating composition at the surface of the substrate; (III) drying the substrate; and (IV) heating the substrate, characterized in that the powder mixture comprises at least three metal compounds of formula A$_{(y-3)}$B$_{y/2}$O$_y$, wherein y is 4; A is selectable from a group of Ni and Co; B is selectable from a group of Fe and Cr; and O is oxygen; and the aqueous solution comprises silica in a compound of Formula (I) above, wherein R$_1$ is H—Si—(CH$_3$)$_2$; and a compound of Formula (2) above, wherein R$_2$ is CH$_3$.

Preferably, the process for applying a high emissivity coating comprises an additional step of applying an abrasive to the surface of the substrate. More preferably, applying such abrasive is carried out by way of sandblasting.

Preferably, the spraying step is for forming a film coating upon the substrate, said film coating having a wet thickness of 100-152 micrometers. It is as well preferable that said film coating has a dry thickness of 25-75 micrometers. More preferably, the spraying is carried out by using a spray gun.

Preferably, the drying is carried out at room temperature.
Preferably, the heating is carried out at 260-650° C.
Preferably, the substrate is a metal. More preferably, such metal is selectable from a group of carbon steel, metal alloy, and stainless steel. It is as well preferable that the substrate is for application with a furnace tube.

Preferably, the high emissivity coating composition is a uniform suspension.

Preferably, the three metal compounds of formula A$_{(3-3)}$B$_{y/2}$O$_y$ have spinel structures. More preferably, these three metal compounds are nickel ferrite (NiFe$_2$O$_4$), nickel chromite (NiCr$_2$O$_4$), and cochromite (CoCr$_2$O$_4$).

It is also preferable that, in addition to the abovementioned three metal compounds, the powder mixture further comprises "fillers". Such fillers are preferably a mixture of cobalt oxide (CoO), titanium diboride (TiB$_2$), chromium diboride (CrB$_2$), magnetite (Fe$_3$O$_4$), kaolin (Al$_4$(OH)$_8$Si$_4$O$_{10}$), and silica (SiO$_2$) in quartz form.

A preferable composition of the powder mixture is one comprising 20-50% by weight of a combination of NiFe$_2$O$_4$ and NiCr$_2$O$_4$; 5-20% by weight of CoCr$_2$O$_4$; 5-15% by weight of CoO; 5-10.6% by weight of TiB$_2$; 1-5% by weight of CrB$_2$; 1-15% by weight of Fe$_3$O$_4$; 5-15% by weight of Al$_4$(OH)$_8$Si$_4$O$_{10}$; and 8-30% by weight of SiO$_2$ (quartz form). More preferably, the powder mixture comprises 10-30% by weight of NiFe$_2$O$_4$, or comprising 10-20% by weight of NiCr$_2$O$_4$.

Preferably, the aqueous solution further comprises potassium silicate.

Preferably, the aqueous solution is a mixture of a first intermediate aqueous solution with a second intermediate aqueous solution, wherein said first intermediate aqueous solution comprises potassium silicate, and said second intermediate aqueous solution comprises silica, the compound of Formula (1), and the compound of Formula (2).

More preferably, the first intermediate aqueous solution comprises 20-40% by weight of potassium silicate. Even more preferably, the first intermediate aqueous solution presents in 30% by weight of potassium silicate.

Preferably, the second intermediate aqueous solution comprises 45-55% by weight in dry basis of a combination of silica, the compound of Formula (1), and the compound of Formula (2).

Surprisingly, the applicant found that a metal substrate coated in accordance with any of the above embodiments exhibits an emissivity as high as 0.81-0.94 at an elevated temperature range of 400-650° C., which are significantly higher than the emissivity exhibited at the same temperatures by a commercially available coating composition. This advantage in particular is useful for improving the heating equipment's thermal and energy efficiencies.

The applicant also found little or no micro-crazing in the microscopic structures of coated substrate.

Moreover, the embodiments may be implemented with only a small number of straightforward steps, and thus require a substantially less time.

Explanation of the technical concept in accordance with the present invention will be supplemented by the following Detailed Description and Examples by way of non-limiting example only.

DETAILED DESCRIPTION OF EMBODIMENTS OF THE INVENTION

Now, mixture systems of metal compounds in the form of A$_{(y-3)}$B$_{(y/2)}$O$_y$ will be disclosed as high emissivity agents, wherein A can be nickel and cobalt, B can be iron and chromium, and y is 4. As is well known by a skilled people in the relevant technical field, much effort is required to develop a combination of components. For example, much trial is required to find the suitable mixture for appropriate solution to suitably spray using spray gun. In addition, much trial is also required to find a suitable mixture exhibiting both high emissivity and good film forming property. Surprisingly, a high emissivity can be achieved at a lower elevated temperature ranging from 400° C. to 650° C. including good film forming of a coating per embodiments in accordance with the present invention.

To form a high emissivity property at a temperature ranging from 400° C. to 650° C., a combination of nickel spinel and cobalt spinel is present. Nickel spinel is obtained from approximately 20% to 50% based on total weight of powder mixture. Nickel spinel can be obtained from nickel ferrite (NiFe$_2$O$_4$), and nickel chromite (NiCr$_2$O$_4$). Nickel ferrite and nickel chromite present from approximately 10 to 30%, and from approximately 10 to 20% based on the total weight of the powder mixture, respectively. Both nickel spinel can be obtained from Alfa Aesa. Cobalt spinel is cochrmite (CoCr$_2$O$_4$), obtained from Alfa Aesa, and generally presents from approximately 5% to 20%. The following fillers can be obtained to fulfill the other coating properties of the coating film. Cobalt oxide (CoO), obtained from Alfa Aesa, can be selected from approximately 5% to 15% based on total weight of powder mixture. It gives hardness which can be employed from titanium diboride ($TiB_2$) and chromium diboride ($CrB_2$), obtained from Alfa Aesa. Generally, titanium diboride ($TiB_2$) and chromium diboride ($CrB_2$) are present from approximately 5 to 10.6%, and from approximately 1 to 5% based on the total weight of the powder mixture, respectively. Magnetite ($Fe_3O_4$), kaolin ($Al_4(OH)_8Si_4O_{10}$), and 8-30% silica ($SiO_2$) in quartz form can be obtained from Nanostructured & Amorphous Materials, Inc. Magnetite is selected from approximately 1% to 5% based on the total weight of powder mixture. Kaolin, obtained from Sigma-Aldrich, is selected in an amount of 5% to 15%. Silica, obtained from Nanostructured & Amorphous Materials, Inc., is generally present in amount of 20% to 40%. These % mentioned filler is based on the total weight of powder mixture.

Emissivity, hardness, filler component, and metal substrate are bonded together when silicate binder and co-binder are dried to create film forming.

An aqueous solution of silicate binder, potassium silicate ($K_2SiO_3$), is obtained by adding 20-40% potassium silicate powder, obtained from Alfa-Aesa, and 60-80% of deionized water based on the total weight of aqueous solution. Optionally, commercially available aqueous solution of potassium silicate can be obtained from Aremco, Ceramabind 643-1.

Co-binder is an aqueous solution of silica in the mixture between silsesquioxane and cyclotetrasiloxane. Preferably, the co-binder comprises 45-55% by weight in dry basis of a combination of silica, silsesquioxane, and cyclotetrasiloxane. Silsesquioxane and cyclotetrasiloxane may be selected from dimethyl siloxy silsesquioxane and octamethyl cyclotetrasiloxane, respectively.

The weight ratio of powder mixture, the aqueous potassium silicate, and silica in the mixture between dimethyl siloxy silsesquioxane and octamethyl cyclotetrasiloxane is 1-5:0.5-4:1, or more preferably 2.5-3.5:2.3-3.2:1. Then, the mixture is mixed and stirred to form a uniform suspension.

A metal substrate may be selected from carbon steel, metal alloy such as 5Cr, 9Cr, 12Cr metal, and stainless steel such as 18Cr metal. The substrate is blasted using Garnet blast media, obtained from Australia, to clean the surface to NACE 1, and to generate a surface profile of 13-75 micrometers.

The uniform suspension is applied on the metal substrate using an appropriate method such as spray gun, and painting, most preferably spray gun having a nozzle of 1-2 mm. Wet film thickness is controlled to be 100-152 micrometers. The wet film was measured using wet film thickness gauge. Then, the dry film is obtained of 25-75 micrometers. The dry film thickness was ensured using Elcometer. The coating thus applied is dried in room temperature for an hour. The coating is then cured by way of sintering from room temperature to a target temperature of 260-650° C. at an appropriate heating rate of 5-10° C./minute.

Emissivity of the coating is measured using industrial practice, Pyrometer, Flir GF 309. The emissivity experiment is conducted at temperature of 400° C. and 650° C. Temperature of substrates are measured using contact temperature such as surface thermocouple or skin temperature or contact temperature. Then emissivity of the pyrometer is adjusted until temperature on the Pyrometer displays the same temperature with contact temperature.

Now, this disclosure will be illustrated in more specific details per following Examples. However, the scope of the disclosure is not limited to these Examples.

EXAMPLES

Example 1

The powder mixture was mixed together using the following composition.

| Composition | Weight (%) |
| --- | --- |
| Nickel ferrite | 15.0 |
| Nickel chromite | 13.0 |
| Cochromite | 13.3 |
| Cobalt oxide | 10.3 |
| Titanium diboride | 10.6 |
| Chromium diboride | 2.3 |
| Magnetite | 3.0 |
| Kaolin | 9.9 |
| Silica (quartz form) | 22.6 |
| Total | 100 |

The binder was prepared by making an aqueous solution of 30% by weight of potassium silicate powder and 70% by weight of deionized water. The powder mixture, the binder, and a co-binder comprising silica in a mixture between dimethyl siloxy silsesquioxane and octamethyl cyclotetrasiloxane, were mixed together at a weight ratio of 2.5:2.3:1, forming a uniform suspension. Specifically, the co-binder comprised 45-55% by weight in dry basis of a combination of silica, dimethyl siloxy silsesquioxane, and octamethyl cyclotetrasiloxane. The 18Cr stainless steel substrate, having a size of 5×5 cm and thickness of 3 mm, was blasted using Garnet blast media, obtained from Australia, to generate a surface profile of 13-50 micrometers, and the surface cleanness was equivalent to NACE 1. The suspension was coated on the blasted substrate using a spray gun of 1-2 mm nozzle. The wet film thickness was controlled to be 100-152 micrometers by controlling the spraying speed. The coated sample was left at room temperature for an hour to dry out bulk water. The dried sample was cured at a heating rate of 5° C./minute from room temperature to a target temperature of 650° C. The final dry thickness after curing was 25-75 micrometers. Micro craze of the coating film was not found using an Optical Microscope. Adhesive ability of the coating film on the substrate was measured per ASTM D4541 and its adhesion was 14 MPa. Emissivity of the coated substrate was measured using Pyrometer, Flir GF309. Emissivity of the coated substrate was 0.81 and 0.93 at 400° C. and 650° C., respectively.

Example 2

The powder mixture was mixed together using the following composition.

| Composition | Weight (%) |
| --- | --- |
| Nickel ferrite | 15.0 |
| Nickel chromite | 13.0 |
| Cochromite | 13.3 |
| Cobalt oxide | 10.3 |
| Titanium diboride | 10.6 |
| Chromium diboride | 2.3 |
| Magnetite | 3.0 |
| Kaolin | 9.9 |
| Silica (quartz form) | 22.6 |
| Total | 100 |

The binder was obtained from Aremco, Ceramabind 643-1, 30% by weight of potassium silicate. The powder mixture, the binder, and a co-binder comprising silica in the mixture between dimethyl siloxy silsesquioxane and octamethyl cyclotetrasiloxane, were mixed together at a weight ratio of 2.5:2.3:1, forming a uniform suspension. Specifically, the co-binder comprised 45-55% by weight in dry basis of a combination of silica, dimethyl siloxy silsesquioxane, and octamethyl cyclotetrasiloxane. The 18Cr stainless steel substrate, having a size of 5×5 cm and thickness of 3 mm, was blasted using Garnet blast media, obtained from Australia, to generate a surface profile of 13-50 micrometers, and the surface cleanness was equivalent to NACE 1. The suspension was coated on the blasted substrate using a spray gun of 1-2 mm nozzle. The wet film thickness was controlled to be 100-152 micrometers by controlling the spraying speed. The coated sample was left at room temperature for an hour to dry out bulk water. The dried sample was cured at a heating rate of 5° C./minute from room temperature to a target temperature of 650° C. The final dry thickness after curing was 25-75 micrometers. Micro craze of the coating film was not found using an Optical Microscope. Moreover, adhesive ability of the coating film on the substrate was measured per ASTM D4541 and its adhesion was 15 MPa. To ensure that the coating film can resist a thermal shock, the samples were heated from room temperature to 650° C. within 3 minutes, then they were cooled to 300° C. within 6 minutes. The thermal shock tests were conducted in 21 cycles. Adhesion of the 21 thermal shock cycles was 14 MPa. On the other hand, adhesion of high emissivity coating obtained from a commercially available coating composition is in the range of 8 to 13.5 MPa.

Moreover, the performance of the coating compositions prepared in accordance with Example 2 was also compared with the performance of a commercially available coating composition at different elevated temperatures (400° C. and 650° C.) by the following experiment.

A 18 Cr stainless steel substrate having a size of 5×5 cm was provided. Half of the substrate was then coated with the coating composition of Example 2; the other half was coated with the commercially available coating composition. Steps and parameters of the coating process in accordance with Example 2 were applied to both halves of the substrate. Next, the entire substrate was heated at an elevated temperature of 400° C., the emissivity of both halves of the substrate were separately measured at such elevated temperature.

The same experiment was replicated at an elevated temperature of 650° C.

Following the above experiments, it was found that, at the lower elevated temperature (400° C.), the substrate coated with the coating of Example 2 exhibited a substantially higher emissivity (ε=0.81) than the substrate coated with the commercially available coating composition (ε=0.70). Likewise, at the higher elevated temperature (650° C.), the substrate coated with the coating of Example 2 exhibited a significantly higher emissivity (ε=0.93) than the substrate coated with the commercially available coating composition (ε=0.92).

Example 3

The powder mixture was mixed together using the following composition.

| Composition | Weight (%) |
| --- | --- |
| Nickel ferrite | 15.0 |
| Nickel chromite | 13.0 |
| Cochromite | 13.3 |
| Cobalt oxide | 10.3 |
| Titanium diboride | 10.6 |
| Chromium diboride | 2.3 |
| Magnetite | 3.0 |
| Kaolin | 9.9 |
| Silica (quartz form) | 22.6 |
| Total | 100 |

The binder was obtained from Aremco, Ceramabind 643-1, 30% by weight of potassium silicate. The powder mixture, the binder, and a co-binder comprising silica in a mixture between dimethyl siloxy silsesquioxane and octamethyl cyclotetrasiloxane, were mixed together at a weight ratio of 2.5:2.3:1, forming a uniform suspension. Specifically, the co-binder comprised 45-55% by weight in dry basis of a combination of silica, dimethyl siloxy silsesquioxane, and octamethyl cyclotetrasiloxane. The carbon steel substrate, having a size of 5×5 cm and thickness of 3 mm, was blasted using Garnet blast media, obtained from Australia, to generate a surface profile of 13-50 micrometers, and the surface cleanness was equivalent to NACE 1. The suspension was coated on the blasted substrate using a spray gun of 1-2 mm nozzle. The wet film thickness was controlled to be 100-152 micrometers by controlling the spraying speed. The coated sample was left at room temperature for an hour to dry out bulk water. The dried sample was cured at a heating rate of 5° C./minute from room temperature to a target temperature of 650° C. The final dry thickness after curing was 25-75 micrometers. Micro craze of the coating film was not found using an Optical Microscope. Emissivity of the coated substrate was measured using Pyrometer, Flir GF309. Emissivity of the coated substrate was 0.81 and 0.93 at 400° C. and 650° C., respectively.

Example 4

The powder mixture was mixed together using the following composition.

| Composition | Weight (%) |
| --- | --- |
| Nickel ferrite | 10.0 |
| Nickel chromite | 10.0 |
| Cochromite | 5.0 |
| Cobalt oxide | 15.0 |
| Titanium diboride | 5.0 |
| Chromium diboride | 5.0 |
| Magnetite | 15.0 |
| Kaolin | 15 |
| Silica (quartz) | 30 |
| Total | 100 |

The binder was obtained from Aremco, Ceramabind 643-1, 30% by weight of potassium silicate. The powder mixture, the binder, and a co-binder comprising silica in a mixture between dimethyl siloxy silsesquioxane and octamethyl cyclotetrasiloxane, were mixed together at a weight ratio of 2.5:2.3:1, forming a uniform suspension. Specifically, the co-binder comprised 45-55% by weight in dry basis of a combination of silica, dimethyl siloxy silsesquioxane, and octamethyl cyclotetrasiloxane. The 12Cr alloy steel substrate, having a size of 5×5 cm and thickness of 3 mm, was blasted using Garnet blast media, obtained from Australia, to generate a surface profile of 13-50 micrometers, and the surface cleanness was equivalent to NACE 1. The suspension was coated on the blasted substrate using a spray gun of 1-2 mm nozzle. The wet film thickness was controlled to be 100-152 micrometers by controlling the spraying speed. The coated sample was left at room temperature for an hour to dry out bulk water. The dried sample was cured at a heating rate of 5° C./minute from room temperature to a target temperature of 650° C. The final dry thickness after curing was 25-75 micrometers. Micro craze of the coating film was not found using an Optical Microscope. Adhesive ability of the coating film on the substrate was measured per ASTM D4541 and its adhesion was 14.7 MPa. Emissivity of the coated substrate was measured using Pyrometer, Flir GF309. Emissivity of the coated substrate was 0.85 and 0.94 at 400° C. and 650° C., respectively.

Example 5

The powder mixture was mixed together using the following composition.

| Composition | Weight (%) |
|---|---|
| Nickel ferrite | 30.0 |
| Nickel chromite | 20.0 |
| Cochromite | 20.0 |
| Cobalt oxide | 5.0 |
| Titanium diboride | 10.0 |
| Chromium diboride | 1.0 |
| Magnetite | 1.0 |
| Kaolin | 5.0 |
| Silica (quartz) | 8.0 |
| Total | 100 |

The binder was obtained from Aremco, Ceramabind 643-1, 30% by weight of potassium silicate. The powder mixture, the binder, and a co-binder comprising silica in a mixture between dimethyl siloxy silsesquioxane and octamethyl cyclotetrasiloxane, were mixed together at a weight ratio of 2.5:2.3:1, forming a uniform suspension. Specifically, the co-binder comprised 45-55% by weight in dry basis of a combination of silica, dimethyl siloxy silsesquioxane, and octamethyl cyclotetrasiloxane. The 12Cr alloy steel substrate, having a size of 5×5 cm and thickness of 3 mm, was blasted using Garnet blast media, obtained from Australia, to generate a surface profile of 13-50 micrometers, and the surface cleanness was equivalent to NACE 1. The suspension was coated on the blasted substrate using a spray gun of 1-2 mm nozzle. The wet film thickness was controlled to be 100-152 micrometers by controlling the spraying speed. The coated sample was left at room temperature for an hour to dry out bulk water. The dried sample was cured at a heating rate of 5° C./minute from room temperature to a target temperature of 650° C. The final dry thickness after curing was 25-75 micrometers. Micro craze of the coating film was not found using an Optical Microscope. Adhesive ability of the coating film on the substrate was measured per ASTM D4541 and its adhesion was 14.0 MPa. Emissivity of the coated substrate was measured using Pyrometer, Flir GF309. Emissivity of the coated substrate was 0.80 and 0.92 at 400° C. and 650° C., respectively.

Example 6

The powder mixture was mixed together using the following composition.

| Composition | Weight (%) |
|---|---|
| Nickel ferrite | 15.0 |
| Nickel chromite | 13.0 |
| Cochromite | 13.3 |
| Cobalt oxide | 10.3 |
| Titanium diboride | 10.6 |
| Chromium diboride | 2.3 |
| Magnetite | 3.0 |
| Kaolin | 9.9 |
| Silica (quartz) | 22.6 |
| Total | 100 |

The binder was obtained from Aremco, Ceramabind 643-1, 30% by weight of potassium silicate. The powder mixture, the binder, and a co-binder comprising silica in a mixture between dimethyl siloxy silsesquioxane and octamethyl cyclotetrasiloxane, were mixed together at a weight ratio of 3.5:3.2:1, forming a uniform suspension. Specifically, the co-binder comprised 45-55% by weight in dry basis of a combination of silica, dimethyl siloxy silsesquioxane, and octamethyl cyclotetrasiloxane. Two 18Cr stainless steel substrates, having a size of 5×5 cm and thickness of 3 mm, were blasted using Garnet blast media, obtained from Australia, to generate a surface profile of 13-50 micrometers, and the surface cleanness was equivalent to NACE 1. The suspension was coated on the blasted substrates using a spray gun of 1-2 mm nozzle. The wet film thickness was controlled to be 100-152 micrometers for both substrates by controlling the spraying speed. The coated samples were left at room temperature for an hour to dry out bulk water. The dried samples were cured using heating rate of 5° C./minute from room temperature to different target temperatures 260° C. for one sample and 400° C. for another. The final dry thickness after curing was 25-75 micrometers for both samples. Micro craze of the coating film was not found in any sample using an Optical Microscope. Moreover, adhesive ability of the coating film on the substrates was measured per ASTM D4541 and the adhesion was 15.0 MPa for both samples. Emissivity of the coated substrates was measured using Pyrometer, Flir GF309. Emissivity of the coated substrate was 0.81 and 0.93 at 400° C. and 650° C., respectively, for both samples.

The invention claimed is:

1. A high emissivity coating composition, comprising
a powder mixture for providing emissivity;
a binder for providing adhesion; and
a co-binder for promoting adhesion and film-forming,
wherein
the powder mixture comprises at least three metal compounds of formula $A_{(y-3)}B_{y/2}O_y$, wherein y is 4; A is selectable from a group of Ni and Co; B is selectable from a group of Fe and Cr; and O is oxygen; and
the co-binder is an aqueous solution comprising silica in a compound of Formula (1):

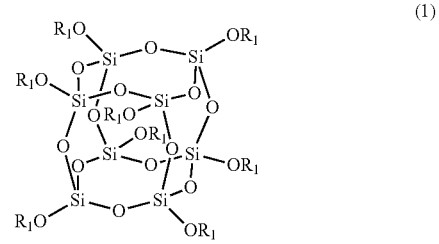

wherein $R_1$ is H-Si-$(CH_3)_2$; and
silica in a compound of Formula (2):

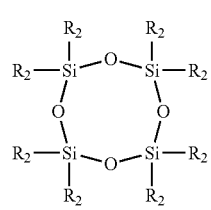
(2)

wherein $R_2$ is $CH_3$.

2. The high emissivity coating composition of claim 1, wherein the three metal compounds of formula $A_{(y-3)}B_{y/2}O_y$ are $NiFe_2O_4$; $NiCr_2O_4$; and $CoCr_2O_4$.

3. The high emissivity coating composition of claim 1, wherein the powder mixture further comprises cobalt oxide (CoO), titanium diboride ($TiB_2$), chromium diboride ($CrB_2$), magnetite ($Fe_3O_4$), kaolin ($Al_4(OH)_8Si_4O_{10}$), and silica ($SiO_2$) in quartz form.

4. The high emissivity coating composition of claim 1, wherein the powder mixture comprises 20-50% by weight of a combination of $NiFe_2O_4$ and $NiCr_2O_4$; 5-20% by weight of $CoCr_2O_4$; 5-15% by weight of CoO; 5-10.6% by weight of $TiB_2$; 1-5% by weight of $CrB_2$; 1-15% by weight of $Fe_3O_4$; 5-15% by weight of $Al_4(OH):Si_4O_{10}$; and 8-30% by weight of $SiO_2$ in quartz form.

5. The high emissivity coating composition of claim 4, wherein the powder mixture comprises 10-30% by weight of $NiFe_2O_4$.

6. The high emissivity coating composition of claim 4, wherein the powder mixture comprises 10-20% by weight of $NiCr_2O_4$.

7. The high emissivity coating composition of claim 1, wherein the binder is an aqueous solution comprising potassium silicate.

8. The high emissivity coating composition of claim 1, wherein the co-binder comprises 45-55% by weight in dry basis of a combination of silica, the compound of Formula (1), and the compound of Formula (2).

9. The high emissivity coating composition of claim 1, wherein the weight ratio of the powder mixture, the binder, and the co-binder is within a range of 2.5-3.5:2.3-3.2:1.

10. A process for preparing a high emissivity coating composition, comprising steps of
providing a powder mixture comprising at least three metal compounds of formula $A_{(y-3)}B_{y/2}O_y$, wherein y is 4; A is selectable from a group of Ni and Co; B is selectable from a group of Fe and Cr; and O is oxygen;
providing a first aqueous solution comprising potassium silicate;
providing a second aqueous solution comprising silica in a compound of Formula (1):

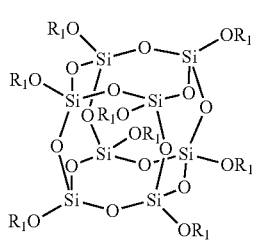
(1)

wherein $R_1$ is H-Si-$(CH_3)_2$; and
silica in a compound of Formula (2):

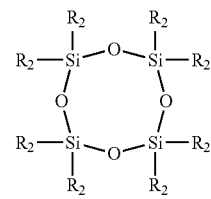
(2)

wherein $R_2$ is $CH_3$; and
mixing the powder mixture with the first aqueous solution and the second aqueous solution.

11. The process of claim 10, wherein the mixing is for forming a uniform suspension.

12. The process of claim 10, wherein the three metal compounds of formula $A_{(y-3)}B_{y/2}O_y$ are $NiFe_2O_4$; $NiCr_2O_4$; and $CoCr_2O_4$.

13. A process for applying a high emissivity coating composition to a substrate, comprising steps of
providing a high emissivity coating composition comprising a powder mixture and an aqueous solution;
spraying the high emissivity coating composition at a surface of the substrate;
drying the substrate; and
heating the substrate,
wherein
the powder mixture comprises at least three metal compounds of formula $A_{(y-3)}B_{y/2}O_y$, wherein y is 4; A is selectable from a group of Ni and Co; B is selectable from a group of Fe and Cr; and O is oxygen; and
the aqueous solution comprises
silica in a compound of Formula (1):

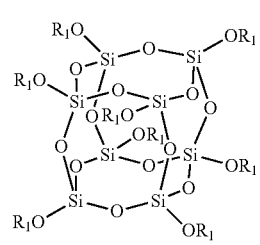
(1)

wherein $R_1$ is H-Si-$(CH_3)_2$; and
silica in a compound of Formula (2):

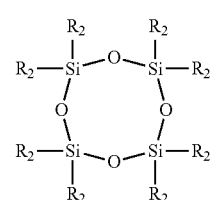
(2)

wherein $R_2$ is $CH_3$.

14. The process of claim 13, further comprising a step of applying an abrasive to the surface of the substrate.

15. The process of claim 13, wherein applying the abrasive is carried out by way of sandblasting.

16. The process of claim 13, wherein the spraying is for forming a film coating upon the substrate, said film coating having a wet thickness of 100-152 micrometers.

17. The process of claim 13, wherein the spraying is for forming a film coating upon the substrate, said film coating having a dry thickness of 25-75 micrometers.

18. The process of claim 13, wherein the heating is carried out at 260-650° C.

19. The process of claim 13, wherein the aqueous solution is a mixture of a first intermediate aqueous solution with a second intermediate aqueous solution, wherein said first intermediate aqueous solution comprises potassium silicate, and said second intermediate aqueous solution comprises silica, the compound of Formula (1), and the compound of Formula (2).

* * * * *